April 16, 1940.   M. H. LOUGHRIDGE   2,196,999
LIQUID CONTROL SYSTEM
Filed Dec. 10, 1936
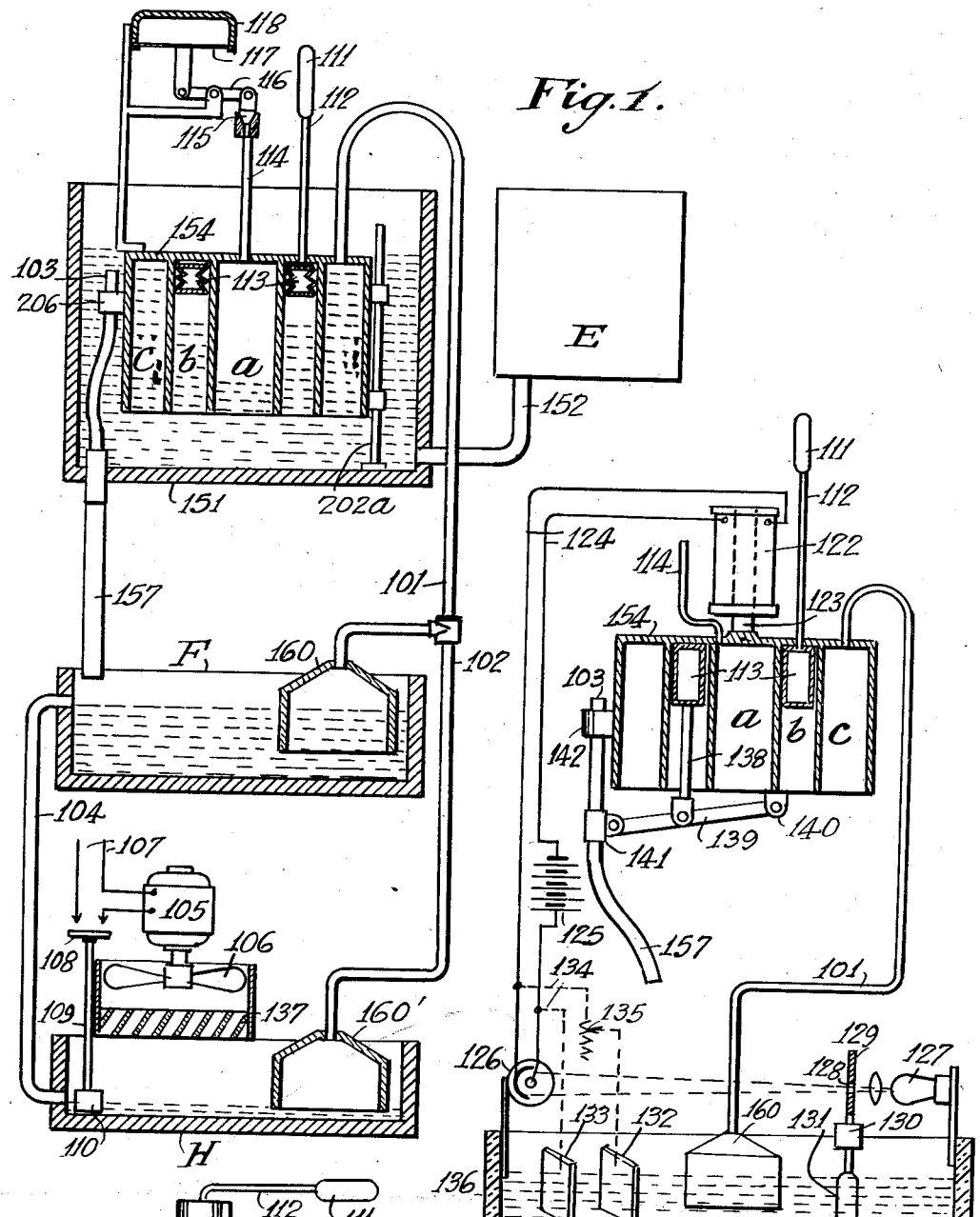
Fig. 1.
Fig. 2.
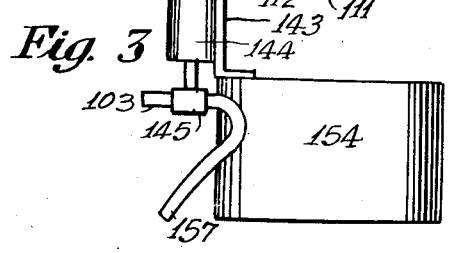
Fig. 3.
INVENTOR.
Matthew H. Loughridge Patented Apr. 16, 1940

2,196,999

UNITED STATES PATENT OFFICE 2,196,999

LIQUID CONTROL SYSTEM

Matthew H. Loughridge, Bogota, N. J.

Application December 10, 1936, Serial No. 115,149

14 Claims. (Cl. 137—68)

This invention relates to a system for controlling the flow of liquids by gravity and may be applied as a syphon or as a float arrangement.

This invention includes a bell and float arrangement for controlling the flow of liquids from a higher to a lower level; another object of the invention is to control the flow of liquids from a higher to a lower level by a device responsive to temperature change; another object of the invention is to control the flow of liquids by a device responsive to atmospheric pressure; another object of the invention is to control the flow of liquids by the specific gravity of the liquid itself and another object of the invention is to control the flow of liquids by the electrical conductivity of the liquid itself. Other objects of the invention will be more particularly understood from the following specification and the accompanying drawing, in which:

Fig. 1 shows a bell and float arrangement with part of the apparatus sectioned for the control of the flow of a liquid from an upper to a plurality of lower tanks, this view also includes the control of the liquid by a device responsive to temperature and also by a device responsive to atmospheric pressure, Fig. 2 is another arrangement of float control for a liquid in which the float is controlled electrically, controlled by the specific gravity of the liquid and controlled by the electrical conductivity of the liquid, and Fig. 3 is a modification of the float and thermostat control.

The present invention is in part, a continuation of the invention in co-pending applications, Serial No. 755,841, December 3, 1934, and now Patent No. 2,131,743, granted October 4, 1938, and Serial No. 47,045, October 28, 1935. The invention is of general application for controlling the flow of liquid by gravity and also by the characteristic of the liquid itself, one use of the invention is in connection with seed germinating machines as disclosed in U. S. Patent 2,051,094, August 18, 1936. Another use for the invention is in controlling the liquid supply to humidifying machines, and other uses are in removing the contents of closed containers.

This invention comprises a system for controlling the flow of liquids from a higher to a lower level which control may be obtained from the quantity of liquid that has passed to the lower level, from the characteristic of this liquid, or from atmospheric conditions or from a combination of these conditions.

As shown, it is applied by means of a float in the delivery tank which controls the orifice of a discharge pipe, as the buoyancy of the float is reduced this orifice is submerged to permit the flow through the discharge, and as the buoyancy is increased the orifice is raised above the liquid to stop the discharge. The control is obtained by fluid pressure which varies the buoyancy of the float.

A receiving tank receives the discharge from the delivery tank. Air is sealed and compressed in a bell in this tank as the liquid rises and a flexible tube connects this bell with the float whereby the air expels part of the liquid from the float and increases its buoyancy to stop the flow. The buoyancy of the float is independently controlled by a pressure fluid responsive to temperature; the buoyancy may also be controlled by a valve responsive to barometric pressure. The buoyancy is further controlled by a magnet which tends to raise the float when energized. The circuit of this magnet is controlled by a device responsive to the specific gravity of the liquid accumulating in the receiving tank, it may also be controlled by the electric conductivity of the liquid.

In Fig. 1 the liquid from tank E flows into tanks F and H and the flow is controlled by the liquid level in both tanks F and H. Tank E connects by pipe 152 with the control tank 151 in which the float 154 operates vertically on the guide 202a. The float comprises a central cylindrical chamber a, a second chamber b surrounding chamber a, and an outer chamber c surrounding chamber b. Chamber c connects by pipe 101 with the bell 160 in tank F and it connects by pipe 102 with the bell 160' in tank H. An overflow pipe 104 connects tank F with tank H and the pipe 157 secured to the float 154, at 206, has a nozzle 103 which is moved up and down with the float 154 so that when it is in the raised position the nozzle 103 is above the level of the liquid in tank 151 and thereby the discharge through pipe 157 is stopped. On the other hand, when the nozzle 103 is below the level of the liquid in tank 151, the liquid flows through the discharge pipe 157 into tank F and when tank F is filled to the level of the discharge pipe 104 the overflow is used to fill tank H.

It will be observed that the bell 160 and the bell 160' are connected in multiple through the pipe 101 to the chamber c. The air trapped in either of these bells is sufficient to raise the float through the chamber c. It will be noted that the seal of the air in pipe 101 requires liquid in both tanks F and H and the last tank to be filled raises the float and stops the flow.

While the chamber c is sufficient to control the float 154 it is also independently controlled by the chambers a and b. The control in chamber b is obtained from the thermostat 111, connecting by-pipe 112 to the bellows 113 in chamber b. The bulb 111 is provided with a volatile fluid which expands upon an increase in temperature and thereby expands the bellows 113 to raise the float and stop the flow under conditions of a predetermined temperature. The bellows 113 confines the gas from the bulb 111 and prevents it from being absorbed by the liquid in chamber b.

The float 154 is also controlled by atmospheric pressure through the chamber a. In this application a pipe 114, leading from chamber a is provided with a valve 115 which is controlled by lever 116 and the diaphragm 117 of the pressure responsive device 118. As arranged in the drawing, when the atmospheric pressure increases it forces the diaphragm 117 inwardly into the vacuum chamber of 118 and thereby closes valve 115 and traps the air in chamber a, thereby increasing the buoyancy of the float 154. On the other hand, when the pressure on diaphragm 117 is reduced the tension of the diaphragm through lever 116, opens valve 115 and reduced the buoyancy of the float 154. The device 118 may be a hygrometer of the usual type arranged to control valve 115.

Each of chambers a and b may be constructed of a capacity sufficient to buoy the float, or they may be together constructed of sufficient capacity to buoy the float independently of the buoyancy obtained from chamber c. When the apparatus is used in a humidifying system, the supply of liquid to the tanks F or H is controlled both by temperature and by atmospheric pressure and the amount of liquid that may be supplied at a time is controlled by the bell and float arrangement described. The humidifier is typically illustrated by the motor 105 having a fan at 106 deflecting an air current through the slots 137 over the top of tank H. The motor is controlled by the circuit 107, switch 108, connected by rod 109, with the float 110 in tank H arranged so that the motor circuit is interrupted when the tank is empty.

The construction in Fig. 2 is arranged to control the flow of the liquid by the specific gravity of the liquid and also by its electrical conductivity. The float 154 is provided with a magnetic stem 123 moving within the solenoid magnet 122, connected by circuit 124 with the battery 125 and with the photoelectric cell 126. The photo cell in this arrangement, when it receives light from the light bulb 127, establishes the circuit 124 and causes the solenoid 122 to lift the float 154 or to increase its buoyancy. The light from the bulb 127 follows the path indicated by the dotted line through the aperture 128 in the shield 129, moving in guide 130 and connected with the bulb 131, floating in the liquid in tank 136 and responsive to the specific gravity of the liquid. A predetermined specific gravity will float bulb 131 so that aperture 128 registers with the line of sight between 127 and 126, in any other position the light beam is interrupted and the magnet 122 is not energized. In this application it will be noted that if, for instance, a heavier liquid is to be added to a lighter liquid in tank 136 until a given specific gravity is reached, the control will stop the flow at this point by energizing magnet 122 and raising the float 154. This operation is, of course, reversible.

The control of the liquid flow may also be regulated by the electric conductivity of the liquid through the electrodes 132 and 133 placed in tank 136 which tank should be made of insulating material. These electrodes, through circuit 134 and resistance 135, complete the circuit 124 of magnet 122 and thereby stop the flow of the liquid. In addition to regulating this circuit by the resistance 135, it is also subject to the distance separating the electrodes 132 and 133, the area of these electrodes immersed in the liquid and to the conductivity of the liquid itself. Any of these factors may be made the controlling factor for establishing a circuit that will energize magnet 122 and raise the float.

The application in Fig. 2 shows the bellows 113 used to raise and lower the position of orifice 103 relative to the float thereby changing the position at which the float will discharge. The bellows 113 connect by rod 138 with lever 139 pivoted at 140 and connected at 141 with discharge tube 157. As the bellows contract due to a lowering of temperature the orifice 103 is raised in the guide 142 secured to the float and when the bellows expand the orifice 103 is lowered relative to the float. As shown in this drawing the expanding bellows increases the buoyancy of the float causing it to rise as the orifice is lowered. If these two conditions were equal they would neutralize each other, however it is a simple matter to adjust the movement of the orifice 103 so that it will exceed the movement of the float due to the added buoyancy caused by 113.

In Fig. 3, the cylinder 144, corresponding to the bellows 113 is placed above the liquid line and is secured to the float by bracket 143. The piston in cylinder 144 connects to the clamp 145 of the orifice 103 so that the orifice is moved up and down relative to the float 154 in response to temperature changes in 111 without affecting the buoyancy of the float itself.

This invention admits of a variety of applications and may be installed complete, or in any of its combinations, or each system may be used by itself to control the flow of liquids according to the conditions under which it is applied. The apparatus is compartively inexpensive, has few moving parts and most of the flexible tubing can be made from rubber hose.

In the operation of the system as illustrated in the diagrams, the float may be made of comparatively light material and be correspondingly sensitive to a change in fluid pressure in its chambers affecting its buoyancy. The flexible tube leading to the discharge orifice may have a specific gravity close to that of the liquid so that it offers little resistance to the movement of the float when the liquid is either low or high in the delivery tank. The chambers a and c are open at the bottom, or communicate at the bottom with the liquid in the tank so that fluid pressure applied at the top of these chambers displaces some of the liquid and increases the buoyancy. The chamber b also communicates with the liquid in the tank at the bottom but the fluid pressure is confined in the expansion chamber 113, which acts upon the air on top of the liquid, or on the liquid itself to displace the liquid from this chamber as the fluid pressure is increased.

The atmospheric control acts on the thermobulb 111 and upon the barometer 118 and is located outside the liquid and, as shown, operates independently of the liquid.

If the receiving tank F only is used and pipe 102 closed, then the air entrapped in bell 160 through pipe 101 is transferred to chamber c of the float at the top, which displaces the liquid from this chamber and increases the buoyancy of the float to stop the discharge. The height of the liquid in tank F at which this will occur is determined by the size and location of the bell in the tank which can easily be adjusted to operate the float when the liquid reaches a predetermined height. If the liquid is slowly removed from tank F the pressure in bell 160 is thereby lowered and also the pressure in chamber c of the float. This slightly lowers the float to permit a flow to the tank F to replace the liquid removed and thus the level of the liquid in tank F may be maintained substantially constant.

If there is an increase in temperature that vaporizes the liquid in bulb 111, the chamber 113, Fig. 1 is expanded and the buoyancy thus produced is added to the buoyancy obtained from bell 160. This would require a lower level in tank F to release more of the holding pressure entrapped by the bell 160 before the replacement flow takes place. If the temperature bulb is applied as in Fig. 3, its operation does not affect the buoyancy of the float, but by lowering the nozzle 103 a greater buoyancy is required to cut off the flow and hence the water level in tank F must rise higher to produce the extra pressure necessary for the increased buoyancy under these conditions. The temperature control may thus be applied to increase or decrease the normal level of the liquid in the receiving tank.

The barometer control as shown in Fig. 1 releases the air from chamber a when the atmospheric pressure is reduced by opening valve 115. Atmospheric changes of this kind usually take place slowly so that this valve opens and closes slowly. When valve 115 is open the buoyancy of chamber a is deducted from the buoyancy supplied by chambers c and b. This requires a higher level of the liquid in the receiving tank to compensate for the deduction of chamber a, or an increase of flow of the liquid as long as valve 115 is open. Under ordinary conditions the liquid flow from the delivery tank to the receiving tank is comparatively rapid so that a state of equalization is restored in a short time after valve 115 opens and the float is raised to shut off the flow. If the liquid is used for humidifying purposes, it saturates the atmosphere and the barometer closes valve 115 with the air trapped in chamber a to restore the buoyancy as the float is lowered. If valve 115 should close when the float is in the lowered position there would be little or no air entrapped in chamber a and this chamber would not be effective in increasing the buoyancy until an operation occurred in which valve 115 closed when the float was raised. It should be noted however, that if the liquid is drained from the delivery tank 151 and then resupplied, the float becomes self restoring with the liquid pressure acting on chambers a, b and c from below.

In practice the bell control may be applied to prevent an overflow of the liquid in the receiving tank while the thermometer and barometer controls may be used to vary the quantity of the flow at any one time.

In Fig. 1 the excess liquid flowing into tank F overflows into tank H through overflow pipe 104 where it is distributed by a humidifying system. The overflow limits the height of the liquid in tank F which seals the bell 160 and the bell 160' in tank H becomes the controlling bell of the float. When the liquid rises to a predetermined height in tank H the supply to tank F is cut off and the overflow ceases to tank H. This predetermined height is modified by the other controls when these are used.

It will be observed that if the liquid is used from tank F more rapidly than from tank H, the bell 160' remains sealed and the lowering of pressure in bell 160 will restore the flow from the delivery tank until the predetermined liquid level is restored.

The application of the invention in Fig. 2 provides for the control of the liquid flow by the characteristic of the liquid in the receiving tank which control is applied electrically. The application is intended for control by a liquid that is changing in characteristic. For instance, if a heavy liquid is added to a light one, the specific gravity of the light liquid increases and in certain chemical applications it is desirable to arrest the flow when a certain specific gravity has been reached. Another application is where an acid may be added to water to obtain a certain degree of acidity after which the flow should be stopped.

The height of the liquid in tank 136 may be regulated by the bell 160, or by other means, as by an overflow pipe 104 shown in Fig. 1. The specific gravity is determined by the bulb 131 which is immersed in the initial liquid. As the specific gravity changes by the flow from pipe 157 into tank 136, controlled by the float, of a liquid having a different specific gravity from the initial liquid, the bulb 131 moves in response to the change in specific gravity. The flow from pipe 157 raises the liquid level in tank 136 comparatively slowly which enables the liquids to mix and to slowly move the bulb 131. When the bulb moves the aperture 128 into the path of the light beam for the photo cell 126, magnet 122 raises the float and shuts off the flow. This condition remains effective to stop the flow when the required specific gravity is reached.

If a heavy liquid is added to a lighter one, it is apparent that the bulb 131 will be raised, and on the other hand, if a light liquid is added to a heavy one the bulb will be lowered. In any case it is necessary to design the aperture 128 to register with the light beam under the conditions required.

If tank 136 is initially supplied with water and the plates 132 and 133 are substantially immersed therein, the resistance of the water will not materially affect the circuit of magnet 122 unless a high voltage is used in battery 125. Now if a comparatively small flow of acid is supplied to this tank from pipe 157, the water becomes a conductor in proportion to its acidity. The size and position of the plates can be so adjusted together with the resistance 135 that a predetermined acidity of the liquid will energize magnet 122 to raise the float and stop the flow. This condition will remain established until the acidity of the liquid is lowered, or until it is removed from the tank. Magnet 122 for operating the float is controlled by the specific gravity and also by the acidity of the liquid. These controls are not independently operative at the same time. The latter would require independent circuits for each purpose.

It should be noted that since the float follows the liquid level of the discharge tank the flow through the discharge pipe is constant for any height of the liquid in this tank.

Having thus described my invention, I claim:

1. A liquid control system comprising a first tank containing the liquid, a second tank at a lower level for receiving the liquid, a hollow float in the first tank having an expansible chamber acting on the liquid in the tank, a discharge pipe having its intake controlled by said float, a bell in the second tank arranged to be sealed as the liquid rises in the tank and a conduit pneumatically connecting said bell with said expansible chamber to increase the buoyancy of the float as the liquid rises in the bell.

2. A liquid control system comprising a first tank containing the liquid, a plurality of tanks at a lower level than the first tank, a discharge pipe for filling said tanks from the first tank, a float in the first tank controlling the intake of said discharge pipe and means in each of said plurality of tanks controlling said float to supply liquid to each of said tanks.

3. A liquid control system comprising a first tank containing the liquid, a second tank for receiving the liquid, a discharge pipe connecting said tanks, a float in the first tank controlling the intake orifice of said pipe and means responsive to the specific gravity of the liquid in one of said tanks controlling the buoyancy of said float.

4. A liquid control system comprising a first tank containing the liquid, a second tank for receiving the liquid, a discharge pipe connecting said tanks, a float in the first tank controlling the intake orifice of said pipe and means responsive to the electrical conductivity of the liquid in said receiving tank controlling the buoyancy of said float.

5. A liquid control system comprising a first tank containing the liquid, a second tank for receiving the liquid, a discharge pipe connecting said tanks, a float in the first tank having two independent expansible chambers controlling the intake of said discharge pipe, a chamber having an expansive medium therein connected with one of said expansible chambers and a second chamber having an expansive medium therein operatively associated with the other expansible chamber.

6. A liquid control system comprising a first tank containing the liquid, a second tank for receiving the liquid, a discharge pipe connecting said tanks, a hollow float controlling the intake of said discharge pipe, pneumatic means responsive to the rise of the liquid in the receiving tank, an air pipe connecting said pneumatic means with said float to vary its buoyancy, and means responsive to temperature change varying the buoyancy of said float.

7. A liquid control system comprising a first tank containing the liquid, a second tank for receiving the liquid, a discharge pipe connecting said tanks, a hollow float controlling the intake of said discharge pipe, pneumatic means responsive to the rise of the liquid in the receiving tank, an air pipe connecting said pneumatic means with said hollow float for varying its buoyancy, a second means responsive to barometric pressure and a third means responsive to temperature change varying the buoyancy of said float.

8. A liquid control system comprising a first tank containing the liquid, a second tank for receiving the liquid, a discharge pipe connecting said tanks, a float controlling the intake of said discharge pipe, a magnet controlling said float and means controlling the circuit of said magnet by the liquid in the receiving tank.

9. A liquid control system comprising a first tank containing the liquid, a second tank for receiving the liquid, a discharge pipe connecting said tanks, a float controlling the intake of said discharge pipe a magnet controlling said float, a circuit including a photo-electric cell controlling said magnet, and means responsive to the liquid in the receiving tank controlling said circuit.

10. A liquid control system comprising a first tank containing the liquid, a second tank for receiving the liquid, a discharge pipe connecting said tanks, a float controlling the intake of said discharge pipe, a magnet controlling said float and means responsive to the conductivity of the liquid in said receiving tank controlling the circuit of said magnet.

11. A liquid cotrol system comprising a first tank containing the liquid, a second tank for receiving the liquid, a discharge pipe connecting said tanks for the gravity flow of the liquid, a float having a plurality of expansible chambers in the first tank, controlling the intake of said discharge pipe and independent means for supplying fluid pressure to each of said chambers to vary the buoyancy of said float.

12. A liquid control system comprising a first tank containing the liquid, a plurality of receiving tanks, a discharge pipe connecting said first tank with said receiving tanks for the gravity flow of the liquid to said tanks progressively, a float controlling the intake of said discharge pipe and having an expansible chamber acting on the liquid in the tank, a bell in each of said receiving tanks, pneumatic means connecting said bells with the expansible chamber of said float, so arranged that the air trapped by the rising liquid in the bell of the last tank filled operates the float to stop the flow.

13. A liquid control system comprising a first tank containing the liquid, a second tank receiving the liquid, a discharge pipe connecting said tanks for the gravity flow of the liquid, a float having a plurality of expanding chambers in the first tank controlling the intake of said discharge pipe, means responsive to the level of the liquid in the receiving tank pneumatically connected to one of said chambers and means responsive to atmospheric conditions connected with another of said chambers for varying the buoyancy of said float.

14. A liquid control system comprising a first tank containing the liquid, a second tank receiving the liquid, a discharge pipe connecting said tanks, a float in the first tank controlling the intake of said discharge pipe, means responsive to the liquid in the receiving tank for varying the buoyancy of the float and means responsive to atmospheric conditions independently varying the buoyancy of the float.

MATTHEW H. LOUGHRIDGE.